United States Patent
Zhang et al.

(10) Patent No.: US 12,218,746 B2
(45) Date of Patent: Feb. 4, 2025

(54) INFORMATION TRANSMISSION METHOD AND DEVICE, COMMUNICATION DEVICE, AND READABLE STORAGE MEDIUM

(71) Applicants: China Mobile Communication Co., Ltd Research Institute, Beijing (CN); China Mobile Communications Group Co., Ltd., Beijing (CN)

(72) Inventors: Dechao Zhang, Beijing (CN); Qian Cai, Beijing (CN); Dong Wang, Beijing (CN); Yunbo Li, Beijing (CN); Han Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 242 days.

(21) Appl. No.: 17/922,077

(22) PCT Filed: Apr. 20, 2021

(86) PCT No.: PCT/CN2021/088470
§ 371 (c)(1),
(2) Date: Oct. 28, 2022

(87) PCT Pub. No.: WO2021/218710
PCT Pub. Date: Nov. 4, 2021

(65) Prior Publication Data
US 2023/0171018 A1    Jun. 1, 2023

(30) Foreign Application Priority Data
Apr. 30, 2020 (CN) .......................... 202010366510.6
Nov. 9, 2020 (CN) .......................... 202011243284.9

(51) Int. Cl.
*H04J 14/02*    (2006.01)

(52) U.S. Cl.
CPC ... *H04J 14/0227* (2013.01); *H04J 2203/0058* (2013.01)

(58) Field of Classification Search
CPC .......... H04J 14/0277; H04J 2203/0057; H04J 2203/0058
See application file for complete search history.

(56) References Cited

U.S. PATENT DOCUMENTS

2002/0016852 A1* 2/2002 Nishihara ............... H04L 69/22 709/236
2002/0176356 A1* 11/2002 Courtney .................. H04L 1/22 370/216

(Continued)

FOREIGN PATENT DOCUMENTS

| CN | 1685652 A | 10/2005 |
| CN | 101494615 A | 7/2009 |

(Continued)

OTHER PUBLICATIONS

Telecommunication Engineering, "Variable Message Format Technology and Performance Analysis", vol. 49, No. 11, Nov. 2009.

*Primary Examiner* — Nathan M Cors
(74) *Attorney, Agent, or Firm* — Price Heneveld LLP

(57) ABSTRACT

The present disclosure provides an information transmission method, an information transmission device, a communication device and a readable storage medium. The information transmission method includes: obtaining OAM information from an optical network; encapsulating the obtained OAM information to form an OAM frame, the OAM frame including N data frames each having a frame length of L, N varying along with a volume of the OAM information, L being a constant value regardless of the volume of the OAM information; and transmitting the OAM frame. The OAM information is transmitted in a length-constant frame, so it is able to facilitate encoding and decoding of a message, (Continued)

simplifying the processing and reduce the time consumption, and facilitate the extension in accordance with a message content and ensure the extendibility, thereby to solve such problems as complicated processing, being time-consuming, and poor extendibility in the conventional OAM information transmission scheme.

20 Claims, 4 Drawing Sheets

(56) References Cited

U.S. PATENT DOCUMENTS

| | | | |
|---|---|---|---|
| 2003/0091045 A1* | 5/2003 | Choi | H04Q 11/0067 370/390 |
| 2004/0218534 A1* | 11/2004 | Song | H04Q 11/0067 370/474 |
| 2006/0077919 A1 | 4/2006 | Gerkis | |
| 2006/0268719 A1 | 11/2006 | Takase et al. | |
| 2015/0030328 A1* | 1/2015 | Fukuda | H04L 41/12 398/58 |
| 2017/0012731 A1 | 1/2017 | Luo et al. | |
| 2018/0026715 A1 | 1/2018 | Zhao et al. | |
| 2019/0268267 A1 | 8/2019 | Pignataro et al. | |
| 2019/0280913 A1 | 9/2019 | Huang et al. | |
| 2020/0220650 A1 | 7/2020 | Cheng et al. | |

FOREIGN PATENT DOCUMENTS

| | | | | |
|---|---|---|---|---|
| CN | 101697500 | A | 4/2010 | |
| CN | 107735988 | A | 2/2018 | |
| CN | 108123813 | A | 6/2018 | |
| CN | 109347648 | A | 2/2019 | |
| CN | 110768742 | A | 2/2020 | |
| CN | 110855269 | A | 2/2020 | |
| CN | 111342929 | A | 6/2020 | |
| EP | 1311137 | B1 * | 3/2012 | ......... H04Q 11/0067 |
| EP | 3393136 | A1 | 10/2018 | |
| JP | 2003283521 | A | 10/2003 | |

* cited by examiner

INFORMATION TRANSMISSION METHOD AND DEVICE, COMMUNICATION DEVICE, AND READABLE STORAGE MEDIUM

CROSS-REFERENCE TO RELATED APPLICATION

This application is the U.S. national phase of PCT Application No. PCT/CN2021/088470 filed on Apr. 20, 2021, which claims a priority of the Chinese patent application No. 202010366510.6 filed on Apr. 30, 2020 and a priority of the Chinese patent application No. 202011243284.9 filed on Nov. 9, 2020, which are incorporated herein by reference in their entireties.

TECHNICAL FIELD

The present disclosure relates to the field of wireless communication technology, in particular to an information transmission method, an information transmission device, a communication device and a readable storage medium.

BACKGROUND

In a communication system, different types of data frames have different lengths, and the lengths of different data frames vary greatly, so in a communication protocol, especially in an interconnection scenario, a definition of a frame length is of important realistic significance for the interconnection.

Currently, for Operation, Administration and Maintenance (OAM) information, an OAM frame is formed mainly through a frame-forming method, and then the OAM information is identified and parsed through a frame alignment function of a receiver. To be specific, there are mainly the following two types of OAM frame-forming methods. (1) OAM length-variable frame: the length of the frame is extended flexibly in accordance with a message content carried therein. The OAM length-variable frame has a flexible format, but its frame alignment process is relatively complicated, and it takes a long time for the frame alignment. (2) OAM length-constant frame: it takes a short time for the frame alignment, but due to a constant length of the message content, its extendibility is poor. When there are many message contents, it is impossible carry the message contents within one frame.

Based on the above, for a current OAM information transmission scheme, there are such problems as complicated processing, being time-consuming and poor extendibility.

SUMMARY

An object of the present disclosure is to provide an information transmission method, an information transmission device, a communication device, and a readable storage medium, so as to solve such problems as complicated processing, being time-consuming, and poor extendibility in the conventional OAM information transmission scheme.

In one aspect, the present disclosure provides in some embodiments an information transmission method for a transmission device, including: obtaining OAM information from an optical network; encapsulating the obtained OAM information to form an OAM frame, the OAM frame including N data frames each having a frame length of L, N varying along with a volume of the OAM information, L being a constant value regardless of the volume of the OAM information; and transmitting the OAM frame.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, when N is 1, prior to encapsulating the obtained OAM information, the information transmission method further includes: determining the volume of the OAM information; and padding the OAM information into the first field.

In some possible embodiments of the present disclosure, when N is a positive integer greater than 1, prior to encapsulating the obtained OAM information, the information transmission method further includes: determining the volume of the OAM information; judging whether the volume of the OAM information is greater than or equal to a predetermined threshold; and determining a value of N when the volume of the OAM information is greater than or equal to the predetermined threshold.

In some possible embodiments of the present disclosure, the determining the value of N includes: determining a numerical range matching the volume of the OAM information; determining a maximum value of the numerical range; calculating a ratio of the maximum value to the frame length L; and taking the ratio as the value of N.

In some possible embodiments of the present disclosure, the encapsulating the obtained OAM information to form the OAM frame includes: forming a first field of each data frame in the N data frames in accordance with the obtained OAM information; forming a second field of each data frame in the N data frames in accordance with the value of N; and forming the OAM frame in accordance with the N data frames.

In some possible embodiments of the present disclosure, when N is a positive integer greater than 1, each data frame in the N data frames includes a field representing an order of the N data frames.

In some possible embodiments of the present disclosure, the transmitting the OAM frame includes: taking a service signal as a carrier signal; modulating a signal corresponding to the OAM frame in accordance with the carrier signal to obtain a modulated signal; and transmitting the modulated signal.

In another aspect, the present disclosure provides in some embodiments an information transmission method for a reception device, including receiving an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, when N is a positive integer greater than 1, each data frame of the N data frames includes a field representing an order of the N data frames. The information transmission method further includes performing frame alignment on the OAM frame in accordance with the field representing the order of the N data frames in each data frame of the N data frames, so as to obtain the OAM information in each data frame.

In yet another aspect, the present disclosure provides in some embodiments an information transmission device for a transmission device, including: a first obtaining module configured to obtain OAM information from an optical network; a first processing module configured to encapsulate the obtained OAM information to form an OAM frame, the OAM frame including N data frames each having a frame length of L, N varying along with a volume of the OAM information, L being a constant value regardless of the volume of the OAM information; and a first transmission module configured to transmit the OAM frame.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, the information transmission device further includes: a first determination module configured to, when N is 1, prior to encapsulating the obtained OAM information, determine the volume of the OAM information; and a second processing module configured to pad the OAM information into the first field.

In some possible embodiments of the present disclosure, the information transmission device further includes: a second determination module configured to, when N is a positive integer greater than 1, prior to encapsulating the obtained OAM information, determine the volume of the OAM information; a first judgment module configured to judge whether the volume of the OAM information is greater than or equal to a predetermined threshold; and a third determination module configured to determine a value of N when the volume of the OAM information is greater than or equal to the predetermined threshold.

In some possible embodiments of the present disclosure, the third determination module is further configured to: determine a numerical range matching the volume of the OAM information; determine a maximum value of the numerical range; calculate a ratio of the maximum value to the frame length L; and take the ratio as the value of N.

In some possible embodiments of the present disclosure, the first processing module is further configured to: form a first field of each data frame in the N data frames in accordance with the obtained OAM information; form a second field of each data frame in the N data frames in accordance with the value of N; and form the OAM frame in accordance with the N data frames.

In some possible embodiments of the present disclosure, when N is a positive integer greater than 1, each data frame in the N data frames includes a field representing an order of the N data frames.

In some possible embodiments of the present disclosure, the first transmission module is further configured to: take a service signal as a carrier signal; modulate a signal corresponding to the OAM frame in accordance with the carrier signal to obtain a modulated signal; and transmit the modulated signal.

In still yet another aspect, the present disclosure provides in some embodiments an information transmission device for a reception device, including a first reception module configured to receive an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, when N is a positive integer greater than 1, each data frame of the N data frames includes a field representing an order of the N data frames. The information transmission device further includes a third processing module configured to perform frame alignment on the OAM frame in accordance with the field representing the order of the N data frames in each data frame of the N data frames, so as to obtain the OAM information in each data frame.

In still yet another aspect, the present disclosure provides in some embodiments a communication device, the communication device being a transmission device and including a processor and a transceiver. The transceiver is configured to: obtain OAM information from an optical network; encapsulate the obtained OAM information to form an OAM frame, the OAM frame including N data frames each having a frame length of L, N varying along with a volume of the OAM information, L being a constant value regardless of the volume of the OAM information; and transmit through the transceiver the OAM frame.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, the processor is further configured to: when N is 1, prior to encapsulating the obtained OAM information, determine the volume of the OAM information; and pad the OAM information into the first field.

In some possible embodiments of the present disclosure, the processor is further configured to: when N is a positive integer greater than 1, prior to encapsulating the obtained OAM information, determine the volume of the OAM information; judge whether the volume of the OAM information is greater than or equal to a predetermined threshold; and determine a value of N when the volume of the OAM information is greater than or equal to the predetermined threshold.

In some possible embodiments of the present disclosure, the processor is further configured to: determine a numerical range matching the volume of the OAM information; determine a maximum value of the numerical range; calculate a ratio of the maximum value to the frame length L; and take the ratio as the value of N.

In some possible embodiments of the present disclosure, the processor is further configured to: form a first field of each data frame in the N data frames in accordance with the obtained OAM information; form a second field of each data frame in the N data frames in accordance with the value of N; and form the OAM frame in accordance with the N data frames.

In some possible embodiments of the present disclosure, when N is a positive integer greater than 1, each data frame in the N data frames includes a field representing an order of the N data frames.

In some possible embodiments of the present disclosure, the processor is further configured to: take a service signal as a carrier signal; modulate a signal corresponding to the OAM frame in accordance with the carrier signal to obtain a modulated signal; and transmit through the transceiver the modulated signal.

In still yet another aspect, the present disclosure provides in some embodiments a communication device, the communication device being a reception device and including a processor and a transceiver. The processor is configured to receive through the transceiver an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

In some possible embodiments of the present disclosure, the check sum carried in the third field is used to check contents associated with the OAM information in the data frame.

In some possible embodiments of the present disclosure, when N is a positive integer greater than 1, each data frame of the N data frames includes a field representing an order of the N data frames. The processor is further configured to perform frame alignment on the OAM frame in accordance with the field representing the order of the N data frames in each data frame of the N data frames, so as to obtain the OAM information in each data frame.

In still yet another aspect, the present disclosure provides in some embodiments a communication device, including a memory, a processor, and a program stored in the memory and executed by the processor. The processor is configured to execute the program so as to implement the above-mentioned information transmission method for the transmission device or the above-mentioned information transmission method for the reception device.

In still yet another aspect, the present disclosure provides in some embodiments a readable storage medium storing therein a program. The program is executed by a processor so as to implement the steps of the above-mentioned information transmission method for the transmission device or the steps of the above-mentioned information transmission method for the reception device.

The present disclosure has the following beneficial effects.

According to the information transmission method in the embodiments of the present disclosure, the OAM information in the optical network is obtained and encapsulated to form the OAM frame, and the OAM frame includes N data frames each having a frame length of L, where N varies along with the volume of the OAM information, and L is a constant value regardless of the volume of the OAM information. Then, the OAM frame is transmitted, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

DETAILED DESCRIPTION

In order to make the objects, the technical solutions and the advantages of the present disclosure more apparent, the present disclosure will be described hereinafter in a clear and complete manner in conjunction with the drawings and embodiments.

The technical solution in the related art will be described hereinafter prior to the description about the technical solutions in the embodiments of the present disclosure.

Figure 1:
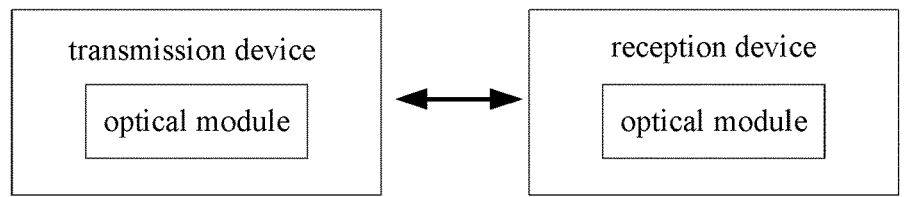
FIG. 1 is a schematic view showing architecture of an optical network in the related art.

FIG. 1 shows architecture of an optical network in the related art. As shown in FIG. 1, the architecture of the optical network includes a transmission device and a reception device, and optical modules are provided in both the transmission device and the reception device so as to achieve an OAM function together. The OAM function includes three functions, i.e., operation, administration and maintenance. The operation function is used to perform such operations as daily analysis, prediction, planning and configuration for the network and services. The administration function is used to monitor and manage resources, performance, warnings, safety and service for the network. The maintenance function is used to perform daily operations on testing and fault management of the network and its services. The OAM function is achieved through the optical modules in the transmission device and the reception device as follows. The performance of the network is monitored to generate maintenance information, and then the stability of the network is evaluated in accordance with the maintenance information. A network fault is detected through regular querying so as to generate various maintenance information and warning information. Normal operation of the network is ensured through scheduling or switching to the other entity, or bypassing a disabled entity. Fault information is transferred to a management entity.

In the related art, the transmission device transmits OAM information to the reception device, so that the reception device monitors the resources, performance, warnings, safety and services for the optical network. Usually, the reception device obtains the OAM information from the transmission device through a frame alignment function. In actual use, when the OAM information changes, it is impossible for the reception device to receive the OAM information through the frame alignment function, and thereby it is impossible for the reception device to obtain the complete OAM information.

In the related art, the transmission device encapsulates the OAM information into an OAM frame, and transmits the OAM frame to the reception device, so that the reception device parses the OAM frame through the frame alignment function. The OAM information is encapsulated by the transmission device into the OAM frame though one of encapsulating the OAM information into a length-variable OAM frame or encapsulating the OAM information into a length-constant OAM frame. However, there are the following defects for the two frame-forming modes. Firstly, when the OAM information is encapsulated into the length-variable OAM frame, a frame length is flexibly adjusted in accordance with a carried message content. Although a format of the length-variable OAM frame is flexible, it is relatively complicated for the reception device to perform the frame alignment on the length-variable OAM frame, and it takes a long time to perform the frame alignment. Secondly, when the OAM information is encapsulated into the length-constant OAM frame, it takes a short time for the reception device to perform the frame alignment on the length-constant OAM frame, but a length of the message content is constant and its extendibility is poor, so it is impossible to carry more message contents.

Figure 2:
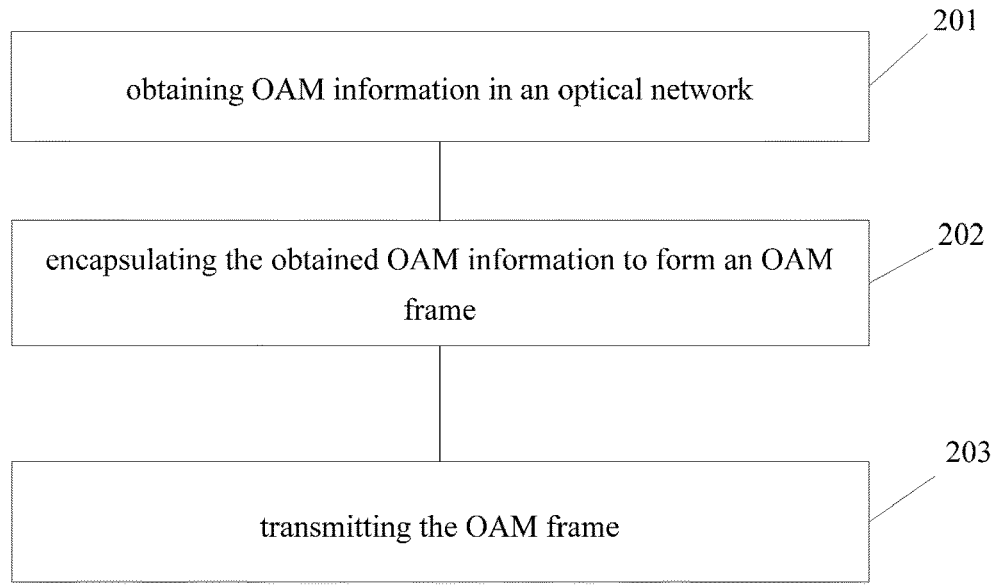
FIG. 2 is a flow chart of an information transmission method according to one embodiment of the present disclosure.

In order to solve such problems as complicated processing, being time-consuming, and poor extendibility in the conventional OAM information transmission scheme, the present disclosure provides in some embodiments an information transmission method for a transmission device which, as shown in FIG. 2, includes: Step 201 of obtaining OAM information from an optical network; Step 202 of encapsulating the obtained OAM information to form an OAM frame, the OAM frame including N data frames each having a frame length of L, N varying along with a volume of the OAM information, L being a constant value regardless of the volume of the OAM information regardless of the volume of the OAM information; and Step 203 of transmitting the OAM frame.

Here, in Step 201, the optical network includes the transmission device and a reception device. The transmission device is also called as a remote device, e.g., an outdoor passive device, such as an antenna device. The reception device is also called as a local device, e.g., an indoor active device, such as an indoor base station. Each of the transmission device and the reception device is provided with an optical module, and the transmission device obtains the OAM information in the optical network from its own optical module.

In Step 202, at the beginning of the operation of the optical network, the optical module in the transmission device operates stably, and little OAM information is generated, so a value of N is smaller. With the elapse of time, an external environment changes and elements are gradually aged, so more OAM information is generated, and at this time, the value of N is larger.

In Step 203, the transmission device transmits the OAM frame to the reception device in the optical network, and the reception device parses the received OAM frame through a frame alignment function, so as to obtain the complete OAM information.

According to the information transmission method in the embodiments of the present disclosure, the OAM information in the optical network is obtained and encapsulated to form the OAM frame, and the OAM frame includes N data frames each having a frame length of L, where N varies along with the volume of the OAM information, and L is a constant value. Then, the OAM frame is transmitted, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

In actual use, when little OAM information is obtained by the optical module in the transmission device, the OAM information is carried in a single data frame, i.e., N=1. When N=1, an optional format of a length-constant frame is shown in Table 1.

TABLE 1

| Frame header ID | Moduler ID | Message type | Message ID | Frame length | Check sum | Message content | Padding | Frame tail ID |
|---|---|---|---|---|---|---|---|---|
| 4 byte | 1 byte | 1 byte | 1 byte | 1 byte | 1 byte | X bytes | Y bytes | 1 byte |

The contents in the frame are defined as follows.

1. Frame header ID: 0x7E7E7E7E, which is used to identify the beginning of the frame.

2. Frame tail ID: 0x7E, which is used to identify the end of the frame.

3. Moduler ID: 0x1-0x18, which is used to identify a management channel corresponding to the frame.

4. Frame length, which is used to indicate a length of the OAM information, i.e., a length of a field where the message content of the OAM information is padded. The length of the field varies along with the OAM information and occupies X bytes.

5. Check sum, which is used to check the moduler ID in each frame, the message type, the information ID, the message length and the message content, i.e., check information in the frame other than the padding field.

6. A defined padding code (i.e., the padding field) is adopted for idle bytes in each frame, and its length is Y bytes. It should be appreciated that, the field for the message content has a length varying along with the length of the OAM information and the length of the entire data frame is constant, so the padding field is actually used for the supplement of the OAM information, so as to ensure that the length of the entire data frame is constant when the length of the padding field is variable. The padding field is merely used for padding, so it is not checked during the checking.

When more OAM information is obtained by the optical module in the transmission device, in order to enable the reception device to obtain the complete OAM information, it is necessary to determine the quantity of data frames carrying the OAM information. In addition, when N is greater than 1, each data frame in the N data frames includes a field for representing an order of the N data frames.

Based on the above, in some possible embodiments of the present disclosure, prior to encapsulating the obtained OAM information, the information transmission method further includes: determining the volume of the OAM information; judging whether the volume of the OAM information is greater than or equal to a predetermined threshold; and when the volume of the OAM information is greater than or equal to the predetermined threshold, determining the value of N.

When the volume of the OAM information is smaller than the predetermined threshold, the OAM information is carried in a single data frame, and when the volume of the OAM information is greater than or equal to the predetermined threshold, the OAM information is carried in the N data frames each having a frame length of L.

Table 2 shows contents in the OAM information. As shown in Table 2, the OAM information includes version information, manufacturer information, optical module information, warning information, digital diagnostic monitoring (DDM) information, pilot tone parameters, thermal electric cooler (TEC) parameters, loopback parameters, extended information, etc. Along with the operation of the transmission device, an external environmental changes and elements are gradually aged, so the quantity of generated abnormality information, e.g., the warning information, increases, and thereby the quantity of OAM information increases.

TABLE 2

| OAM information | Contents |
|---|---|
| Version information | Version update log |
| Manufacturer information | Manufacturer name, and manufacturer ID |
| Optical module information | Product name, module serial number, production date Rate, range, type, and wavelength |
| Warning information | High/low transmission light power warning, TEC warning, high/low reception light power warning, LOS, and LOL |
| DDM information | Transmission light power, reception light power, temperature, laser current, voltage |
| Pilot tone parameter | Code rate, and pilot tone depth |
| TEC parameter | TEC operating voltage and current |
| LoopBack parameter | Electrical/optical port loopback |
| Extended information | Intelligent fault delimitation |

Figure 3:
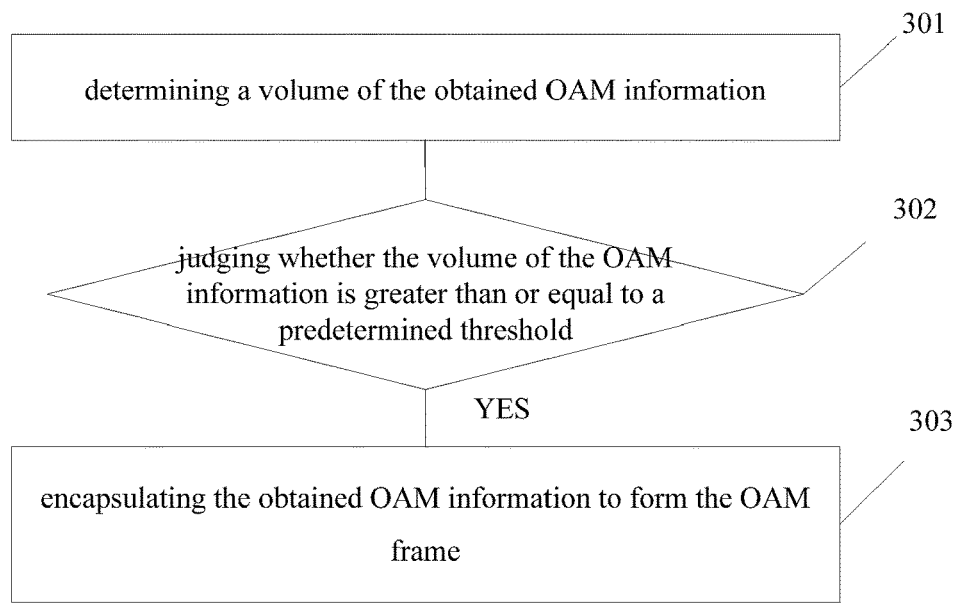
FIG. 3 is a flow chart of a procedure of encapsulating OAM information to form an OAM frame according to one embodiment of the present disclosure.

In some possible embodiments of the present disclosure, as shown in FIG. 3, the encapsulating the OAM information to form the OAM frame includes the following steps.

Step 301: determining the volume of the obtained OAM information.

Step 302: judging whether the volume of the OAM information is greater than or equal to a predetermined threshold, and determining the volume of the OAM information is greater than or equal to the predetermined threshold, proceeding to Step 303.

In actual use, apart from the OAM information, some other information is further carried in the data frame. Hence, when the frame length L of a single data frame is 64 bytes and the other information occupying 10 bytes needs to be carried in the data frame, the predetermined threshold is 64−10=54.

Step 303: encapsulating the obtained OAM information to form the OAM frame.

The OAM frame includes N data frames each having a frame length of L, where N and L are each a positive integer greater than 1, N varies along with the volume of the OAM information, and L is a constant value regardless of the volume of the OAM information. Each data frame in the N data frames includes a field representing an order of the N data frames.

Here, when the volume of the OAM information is smaller than the predetermined threshold, the OAM information is carried in a single data frame having a frame length of L.

When the volume of the OAM information is greater than or equal to the predetermined threshold, the OAM information is carried in the N data fames each having a frame length of L, so it is able to determine a total frame length of the OAM frame in accordance with the volume of the OAM information. To be specific, when the volume of the OAM information is smaller than the predetermined threshold, the OAM information is carried in a single data fame, and when the volume of the OAM information is greater than or equal to the predetermined threshold, the OAM information is carried in N data frames each having a frame length of L. Depending on different volumes of the OAM information, the total length of the OAM frame is different. Especially in an interconnection scenario, it is of important realistic significance for the interconnection to determine the total frame length of the OAM frame in accordance with the volume of the OAM information.

In actual use, when the volume of the OAM information is greater than or equal to the predetermined threshold, the OAM information is carried in N data frames each having a frame length of L, where the value of N is determined in accordance with the volume of the OAM information.

Based on the above, in some possible embodiments of the present disclosure, the determining the value of N includes: determining a numerical range matching the volume of the OAM information; determining a maximum value of the numerical range; calculating a ratio of the maximum value to the frame length L; and taking the ratio as the value of N.

Figure 4:
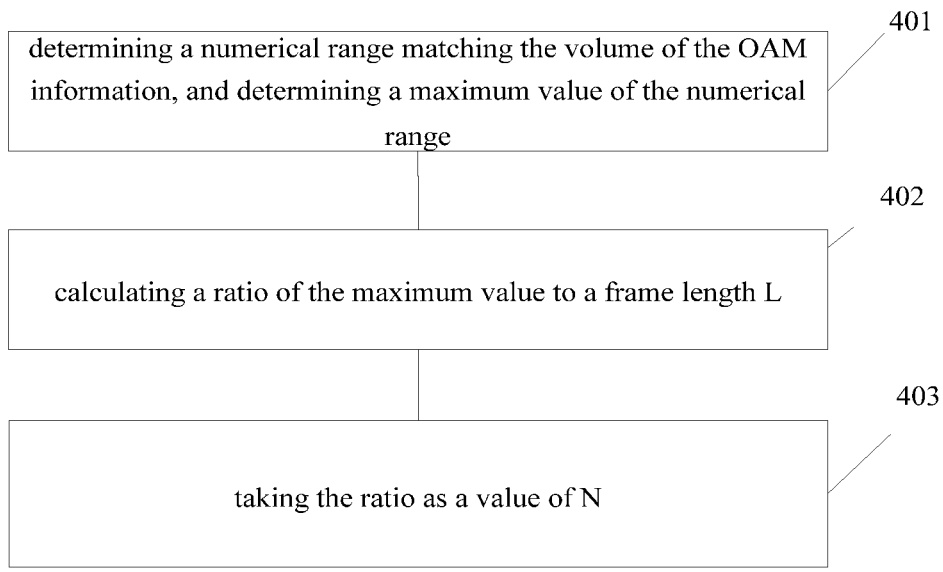
FIG. 4 is a flow chart of a procedure of determining a value of N according to one embodiment of the present disclosure.

In some possible embodiments of the present disclosure, as shown in FIG. 4, the determining the value of N includes the following steps.

Step 401: determining a numerical range matching the volume of the OAM information, and determining a maximum value of the numerical value range.

In actual use, apart from the OAM information, some other information is further carried in the data frame. Hence, when the other information occupying 10 bytes needs to be carried in the single data frame, the numerical range matching the volume of the OAM information is (0, M], where M is a positive integer.

Step 402: calculating a ratio of the maximum value to the frame length L.

When M is 108 and the frame length L of a single frame is 64, M/L=108/64=1.68.

Step 403: taking the ratio as the value of N.

Here, when the ratio is not an integer, an integral part of the ratio is incremented by 1, and a resultant value is taken as the value of N. For example, when the ratio is 1.68, the value of N is 2.

Here, when the value of N is determined in accordance with the volume of the OAM information, there are the following advantages.

The value of N is variable. When the volume of the OAM information is relatively large, a large value of N is adopted, and when the volume of the OAM information is relatively small, a small value of N is adopted, so as to ensure that more OAM information is carried in the OAM frame. In addition, with respect to the transmission devices from different manufacturers, when essential OAM information is to be carried, the OAM information is encapsulated using a same value of N, so as to achieve the interconnection between the transmission devices from different manufacturers. When some other private information related to the manufacturer needs to be carried apart from the essential OAM information, the OAM information is encapsulated using a larger value of N, so as to meet the requirement of different manufacturers on the information transmission and achieve the interconnection between the transmission devices from different manufacturers.

In actual use, when the volume of the OAM information is greater than or equal to the predetermined threshold, the OAM information is encapsulated using the N data frames each having a frame length of L, so as to form the OAM frame.

Based on the above, in some possible embodiments of the present disclosure, the encapsulating the obtained OAM information to form the OAM frame includes: forming a first field of each data frame in the N data frames in accordance with the obtained OAM information; forming a second field of each data frame in the N data frames in accordance with the value of N; and forming the OAM frame in accordance with the N data frames.

The first field is used to carry the OAM information which has changed, so a length of the first field is also variable. The second field is used to notify the value of N to the reception device, so that the reception device performs frame alignment accurately on the received OAM frame and then obtains the complete OAM information.

Here, the first field of each data frame in the N data frames, i.e., a message content field, is formed in accordance with the obtained OAM information, and the second field of each data frame in the N data frames, i.e., a field for the value of N, is formed in accordance with the value of N. In actual use, the second field is also a field for a value of a total frame length of the OAM frame, i.e., N*L.

In actual use, apart from the OAM information and the value of N, some other information, e.g., a check sum field, also needs to be carried in the OAM frame.

Based on the above, in some possible embodiments of the present disclosure, each data frame in the N data frames further includes a third field for checking a content associated with the OAM information in each data frame.

Here, the third field is a check sum field. It is unnecessary to check the padding field through the check sum field in each data frame in the N data frames, and instead, the content associated with the OAM information is checked through the check node field. In this way, it is able to reduce the quantity of contents to be checked, thereby to improve the checking efficiency.

Here, there are the following two circumstances for a procedure of determining the padding field in each data frame in the N data frames.

In a first circumstance, the padding is performed on a padding field in a last data frame in the N data frames.

When N is 2, L is 64, the information in each data frame other than the OAM information occupies 10 bytes and the volume of the OAM information is 100 bytes, a padding field in a first data frame occupies 0 byte, a message content field in the first data frame occupies 64−10=54 bytes, a message content field in a second data frame occupies 100−54=46 bytes, and a padding field in the second data frame occupies 64−10−46=8 bytes.

In a second circumstance, the padding is performed on a padding field in each data frame in the N data frames.

When N is 2, L is 64, the information in each data frame other than the OAM information occupies 10 bytes and the volume of the OAM information is 100 bytes, a message content field in a first data frame occupies 100/2=50 bytes, a padding field in the first data frame occupies 64-10-50=4 bytes, a message content field in a second data frame occupies 100/2=50 bytes, and a padding field in the second data frame occupies 64-10-50=4 bytes.

It can be seen that, the length of the padding field is also variable.

Figure 5:
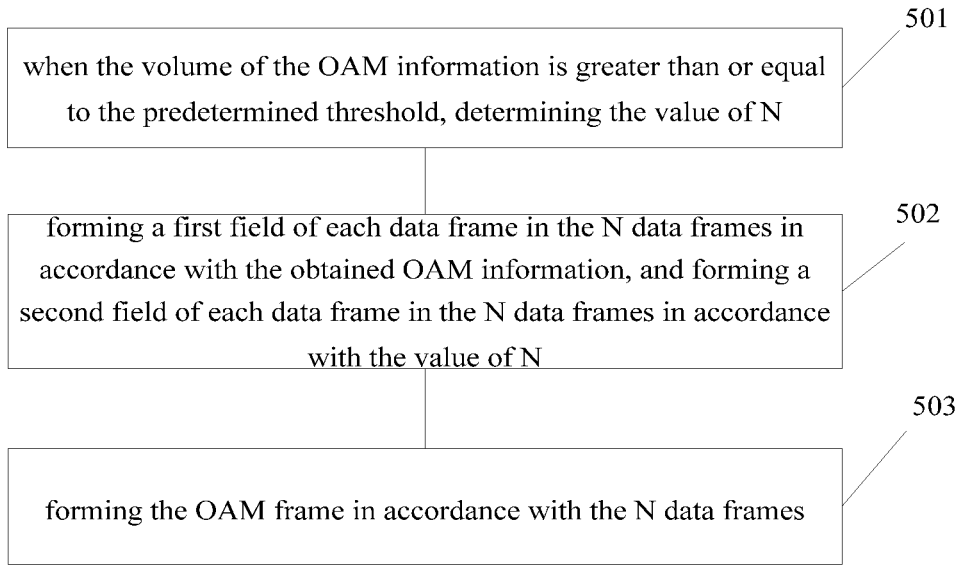
FIG. 5 is another flow chart of the procedure of encapsulating the OAM information to form the OAM frame according to one embodiment of the present disclosure.

In some possible embodiments of the present disclosure, as shown in FIG. 5, a procedure of encapsulating the OAM information to form the OAM frame includes the following steps.

Step 501: when the volume of the OAM information is greater than or equal to a predetermined value, determining the value of N.

Step 502: forming a first field of each data frame in the N data frames in accordance with the obtained OAM information, and forming a second field of each data frame in the N data frames in accordance with the value of N.

It is presumed that N is 2 and L is 64 bytes. Table 3 shows structures of two data frames each having a frame length of L. As shown in Table 3, each of the two data frames includes such fields as frame header ID, moduler ID, message type, message ID, value of N, check sum, message content, padding and frame tail ID. The first field, i.e., the message content field, is used to represent the volume of the OAM information. The second field, i.e., the field for the value of N, is determined in accordance with the volume of the OAM information. The frame header ID field is used to represent an order of the N data frames, e.g., a frame header ID of a first data frame is 1 and occupies 4 bytes, and a frame header ID of a second data frame is 2 and occupies 4 bytes. The check field is used to check the fields other than the padding field, e.g., the frame header ID, the moduler ID and the message type, i.e., it is unnecessary to check all the fields.

TABLE 3

| Frame header ID | Moduler ID | Message type | Message ID | Value of N | Check sum | Message content | Padding | Frame tail ID |
|---|---|---|---|---|---|---|---|---|
| 4 byte | 1 byte | 1 byte | 1 byte | 1 byte | 1 byte | X1 byte | Y1 byte | 1 byte |
| 4 byte | 1 byte | 1 byte | 1 byte | 1 byte | 1 byte | X2 byte | Y2 byte | 1 byte |

Step 503: forming the OAM frame in accordance with the N data frames.

The N data frames are combined in accordance with the order of the N data frames, so as to obtain the OAM frame.

Here, the OAM frame consists of the N data frames each having a frame length of L, and a frame structure of each of the N data frames has the following advantages.

Each data frame in the N data frames has a constant frame length, and includes a field for indicating the order of the N data frames and a field for indicating the value of N. In this way, it is able for the reception device to perform the frame alignment accurately in accordance with the two fields. As compared with the related art where more OAM information is carried through changing the frame length, it is able to prevent the occurrence of a frame alignment failure due to the inconstant frame length when the frame alignment is performed by the reception device in accordance with a fixed period. In addition, it is unnecessary to check all the contents through the checking field, so it is able for the reception device not to check all the contents due to the inconstant frame length, thereby to improve the checking accuracy. In actual use, the transmission device increases or decreases the value of N in accordance with the volume of the OAM information. Each data frame includes the field for indicating the value of N, so the optical module of the reception device is notified of the same value of N as the transmission device.

In actual use, usually the transmission device transmits a service signal to the reception device, so the OAM frame is transmitted to the reception device through the service signal.

Based on the above, in some possible embodiments of the present disclosure, the transmitting the OAM frame includes: taking a service signal as a carrier signal; modulating a signal corresponding to the OAM frame in accordance with the carrier signal to obtain a modulated signal; and transmitting the modulated signal.

Here, in actual use, the optical module in the transmission device reads, through an internal probe, such OAM information as voltage, temperature and biased current, stores the OAM information in a data storage unit, and encapsulates the OAM information in the data storage unit to form the OAM frame, modulates the OAM frame on a subcarrier signal corresponding to a to-be-outputted service signal in a pilot tone manner, and transmits the OAM frame and the service signal together to the reception device. The pilot tone refers to taking the service signal as the carrier signal and modulating the OAM frame to a peak value of the carrier signal. When the service signal is used for the modulation for many times, the service signal used for the modulation for the first time is called as the subcarrier signal.

In the embodiments of the present disclosure, the transmission device may transmit the OAM frame to the reception device, or receive the OAM frame from the other device.

An optical module of a forward management system collects information related to a current port, including port information, warning information, voltage, current, power and LOS, encapsulates the information into an OpenWDM OAM message, and transmits it to an optical path after modulation.

An OAM link encoding procedure will be described as follows.

1. A message at a link layer is encoded in accordance with a message type, so as to obtain a message ID, a message type, a message length and a message content. 2. The encoded message is filled into an OAM link layer message frame format. 3. An idle content is padded at an idle position in the link layer frame format. 4. A check sum is calculated in accordance with a valid message content, a moduler ID, the message type, the message ID, the message length and the message content, and then filled into the OAM message frame format. 5. A message frame header and a message frame tail are encapsulated to obtain a length-constant message having 64 bytes, and then the message is transmitted to a physical layer for transmission.

An OAM link decoding procedure will be described as follows.

1. The physical layer parses the OAM frame to obtain link layer frame data. 2. The frame alignment is performed in accordance with the frame header and the frame tail to obtain a length-constant frame having 64 bytes. 3. The moduler ID, the message type, the message ID, the message length and the message content are obtained in accordance with a definition of the frame format. 4. The check sum is calculated in accordance with the valid message content, the moduler ID, the message type, the message ID, the message length and the message content, and then whether the calculated check sum matches the check sum in the frame is determined. 5. When the calculated check sum matches the check sum in the frame, the OAM frame is transmitted to an OAM protocol layer for processing.

According to the embodiments of the present disclosure, when the volume of the OAM information changes, the OAM information is encapsulated through the N data frames each having a constant frame length to obtain the OAM frame, and then the OAM frame is transmitted. As a result, the reception device performs the frame alignment accurately in accordance with the frame in each data frame in the OAM frame for representing the order of the N data frames, so as to obtain the complete OAM information.

Figure 6:
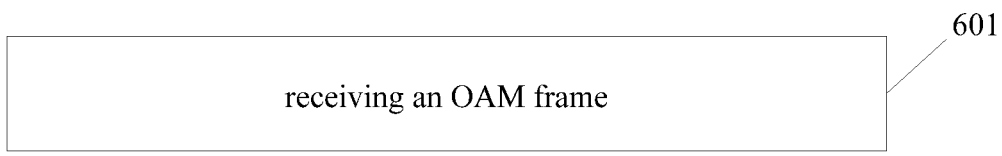
FIG. 6 is another flow chart of the information transmission method according to one embodiment of the present disclosure.

Correspondingly, the present disclosure further provides in some embodiments an information transmission method which, as shown in FIG. 6, includes Step 601 of receiving an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

Here, the optical network includes a transmission device and the reception device. The transmission device is also called as a remote device, e.g., an outdoor passive device, such as an antenna device. The reception device is also called as a local device, e.g., an indoor active device, such as an indoor base station. Each of the transmission device and the reception device is provided with an optical module, and the transmission device obtains the OAM information in the optical network from its own optical module.

According to the information transmission method in the embodiments of the present disclosure, the OAM frame is received and it is formed through encapsulating OAM information in an optical network. The OAM frame includes N data frames each having a frame length of L, where N varies along with the volume of the OAM information, L is a constant value regardless of the volume of the OAM information, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

To be specific, the check sum carried in the third field is used to check contents associated with the OAM information in the data frame.

In actual use, the reception device may parse the OAM frame through a frame alignment function, so as to obtain the complete OAM information.

Based on the above, in some possible embodiments of the present disclosure, when N is a positive integer greater than 1, each data frame of the N data frames includes a field representing an order of the N data frames. The information transmission method further includes performing frame alignment on the OAM frame in accordance with the field representing the order of the N data frames in each data frame of the N data frames, so as to obtain the OAM information in each data frame.

Here, the reception device identifies each data frame in the OAM frame through frame alignment to obtain the OAM information in each data frame, and then obtains information about a real-time operating status of the optical module of the transmission device in accordance with the obtained OAM information. The transmission device stores the obtained information about the operating status of the optical module of the transmission device in a local resource management system. Such long-term operating data as a voltage, a temperature and a biased current of the optical module of the transmission device is recorded through the resource management system, and an operating trend of the optical module of the transmission device is analyzed, so as to help an operator to manage and predict a service life of the optical module of the transmission device, or rapidly determine whether a fault occurs in a module or on a line, or whether the fault occurs in a local optical module or in the optical module of the transmission device. Through rapidly positioning the fault, it is able to reduce a fault correction time of the system.

It should be appreciated that, here, the reception device performs the frame alignment through a synchronization circuit. A frame alignment signal generated by the synchronization circuit is at an exactly same phase as a received OAM frame signal. The synchronization circuit captures the frame alignment signal in the OAM frame signal, i.e., the field representing the order of the N data frames, and calibrates a time system of the reception device by taking a phase of the frame alignment signal as a standard, so as to achieve the accurate separate of the frame signals in the OAM frame. A capturing procedure is associated with such factors as the frame length, a frame alignment code pattern and a method for confirming the frame alignment signal.

Figure 7:
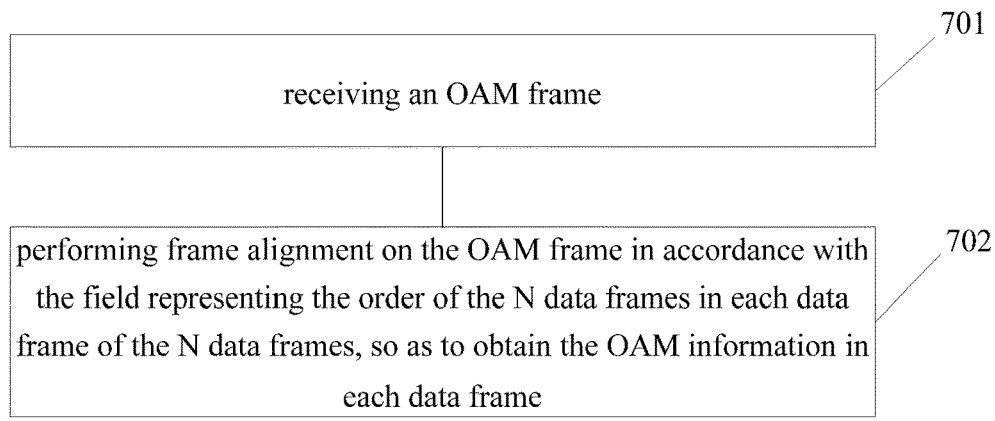
FIG. 7 is a flow chart of a procedure of parsing the OAM frame according to one embodiment of the present disclosure.

In some possible embodiments of the present disclosure, as shown in FIG. 7, a procedure of parsing the OAM frame includes: Step 701 of receiving the OAM frame; and Step 702 of performing the frame alignment on the OAM frame in accordance with a field in each data frame in the N data frames for representing an order of the N data frame, so as to obtain the OAM information in each data frame.

Here, during the frame alignment on the OAM frame, when a value of a field in a next frame for representing the order of the N data frames is different from the value of N, a frame after the next frame is read continuously. When the value of the field in the next frame for representing the order of the N data frames is the same as the value of N, a reading operation is ended.

Here, when the OAM frame is identified through the frame alignment, there are the following advantages.

The OAM frame from the transmission device includes N data frames each having a frame length of L. As a result, when the volume of the OAM information increases, a period for performing, by the reception device, the frame alignment on the OAM frame is constant. In this way, it is able to accurately position each data frame, thereby to obtain the complete OAM information.

According to the embodiments of the present disclosure, when the volume of the OAM information changes, the reception device receives the OAM frame from the transmission device, and accurately performs the frame alignment in accordance with the field in each data frame in the OAM frame for representing the order of the N data frames, so as to obtain the complete OAM information.

Figure 8:
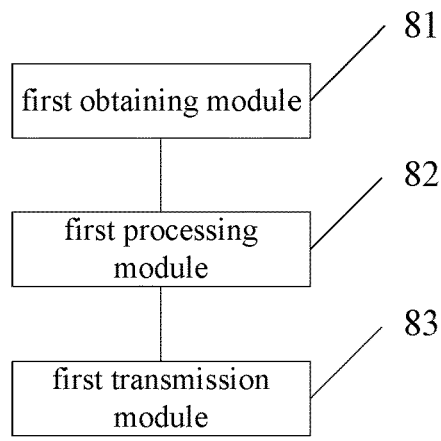
FIG. 8 is a block diagram of an information transmission device according to one embodiment of the present disclosure.

The present disclosure further provides in some embodiments an information transmission device disposed at a transmission device which, as shown in FIG. 8, includes: a first obtaining module 81 configured to obtain OAM information from an optical network; a first processing module 82 configured to encapsulate the obtained OAM information to form an OAM frame, the OAM frame including N data frames each having a frame length of L, N varying along with a volume of the OAM information, L being a constant value regardless of the volume of the OAM information; and a first transmission module 83 configured to transmit the OAM frame.

According to the information transmission device in the embodiments of the present disclosure, the OAM information in the optical network is obtained and encapsulated to form the OAM frame, and the OAM frame includes N data frames each having a frame length of L, where N varies along with the volume of the OAM information, and L is a constant value. Then, the OAM frame is transmitted, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

In some possible embodiments of the present disclosure, the data frame includes a variable first field for carrying variable OAM information, a second field for indicating a value of N or a length of the OAM information, a third field for carrying a check sum, and a variable fourth field for padding a vacant part of the data frame.

To be specific, the check sum carried in the third field is used to check contents associated with the OAM information in the data frame.

The information transmission device further includes: a first determination module configured to, when N is 1, prior to encapsulating the obtained OAM information, determine the volume of the OAM information; and a second processing module configured to pad the OAM information into the first field.

The information transmission device further includes: a second determination module configured to, when N is a positive integer greater than 1, prior to encapsulating the obtained OAM information, determine the volume of the OAM information; a first judgment module configured to judge whether the volume of the OAM information is greater than or equal to a predetermined threshold; and a third determination module configured to determine a value of N when the volume of the OAM information is greater than or equal to the predetermined threshold.

In the embodiments of the present disclosure, the third determination module is further configured to: determine a numerical range matching the volume of the OAM information; determine a maximum value of the numerical range; calculate a ratio of the maximum value to the frame length L; and take the ratio as the value of N.

The first processing module 82 is specifically configured to: form a first field of each data frame in the N data frames in accordance with the obtained OAM information; form a second field of each data frame in the N data frames in accordance with the value of N; and form the OAM frame in accordance with the N data frames.

When N is a positive integer greater than 1, each data frame in the N data frames includes a field representing an order of the N data frames.

To be specific, the first transmission module is further configured to: take a service signal as a carrier signal; modulate a signal corresponding to the OAM frame in accordance with the carrier signal to obtain a modulated signal; and transmit the modulated signal.

In actual use, the first obtaining module 81 is implemented through a communication interface in the information transmission device, and the first processing module 82 and the first transmission module 83 are implemented through a processor in conjunction with the communication interface in the information transmission device.

Figure 9:
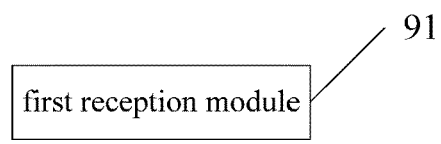
FIG. 9 is another block diagram of the information transmission device according to one embodiment of the present disclosure.

The present disclosure further provides in some embodiments an information transmission device disposed at a reception device which, as shown in FIG. 9, includes a first reception module 91 configured to receive an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

According to the information transmission device in the embodiments of the present disclosure, the OAM frame is received and it is formed through encapsulating OAM information in an optical network. The OAM frame includes N data frames each having a frame length of L, where N varies along with the volume of the OAM information, L is a constant value regardless of the volume of the OAM information, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

The data frame includes a variable first field for carrying variable OAM information, a second field for indicating a value of N or a length of the OAM information, a third field for carrying a check sum, and a variable fourth field for padding a vacant part of the data frame.

To be specific, the check sum carried in the third field is used to check contents associated with the OAM information in the data frame.

In the embodiments of the present disclosure, when N is a positive integer greater than 1, each data frame of the N data frames includes a field representing an order of the N data frames. The information transmission device further includes a third processing module configured to perform frame alignment on the OAM frame in accordance with the field representing the order of the N data frames in each data frame of the N data frames, so as to obtain the OAM information in each data frame.

In actual use, the first reception module 91 is implemented through a communication interface in the information transmission device, and the third processing module is implemented through a processor in conjunction with the communication interface in the information transmission device.

It should be appreciated that, during the information transmission, the above-mentioned information transmission device is merely described on the basis of the above-mentioned program modules. In actual use, the above processings may be completed through different program modules according to the practical need, i.e., an internal structure of the device may be divided into different program modules to complete all or a part of the described processings. In addition, the information transmission device in the embodiments of the present disclosure belongs to a same concept as the information transmission method, and the specific implementation of the path creation device may refer to that of the information transmission method, which will thus not be particularly defined herein.

Figure 10:
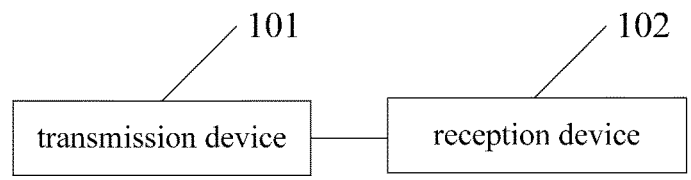
FIG. 10 is a block diagram of an information transmission system according to one embodiment of the present disclosure.

In order to implement the information transmission method, the present disclosure further provides in some embodiments an information transmission system which, as shown in FIG. 10, includes: a transmission device 101 configured to obtain OAM information in an optical network, encapsulate the obtained OAM information to form an OAM frame, and transmit the OAM frame, the OAM frame including N data frames each having a frame length L, N varying along with a volume of the OAM information, L being a constant value regardless of the volume of the OAM information; and a reception device 102 configured to receive the OAM frame.

It should be appreciated that, the specific processing procedures of the transmission device 101 and the reception device 102 have been described hereinabove, and thus will not be particularly defined herein.

Figure 11:
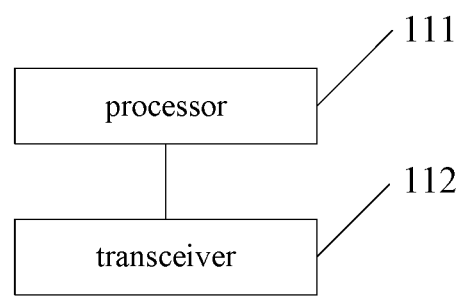
FIG. 11 is a block diagram of a communication device according to one embodiment of the present disclosure.

The present disclosure further provides in some embodiments a communication device which is a transmission device and which, as shown in FIG. 11, includes a processor 111 and a transceiver 112. The processor 111 is configured to: obtain OAM information from an optical network; encapsulate the obtained OAM information to form an OAM frame, the OAM frame including N data frames each having a frame length of L, N varying along with a volume of the OAM information, L being a constant value regardless of the volume of the OAM information; and transmit through the transceiver 112 the OAM frame.

According to the communication device in the embodiments of the present disclosure, the OAM information in the optical network is obtained and encapsulated to form the OAM frame, and the OAM frame includes N data frames each having a frame length of L, where N varies along with the volume of the OAM information, and L is a constant value. Then, the OAM frame is transmitted, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

The data frame includes a variable first field for carrying variable OAM information, a second field for indicating a value of N or a length of the OAM information, a third field for carrying a check sum, and a variable fourth field for padding a vacant part of the data frame.

To be specific, the check sum carried in the third field is used to check contents associated with the OAM information in the data frame.

The processor is further configured to: when N is 1, prior to encapsulating the obtained OAM information, determine the volume of the OAM information; and pad the OAM information into the first field.

The processor is further configured to: when N is a positive integer greater than 1, prior to encapsulating the obtained OAM information, determine the volume of the OAM information; judge whether the volume of the OAM information is greater than or equal to a predetermined threshold; and determine a value of N when the volume of the OAM information is greater than or equal to the predetermined threshold.

In the embodiments of the present disclosure, the processor is specifically configured to: determine a numerical range matching the volume of the OAM information; determine a maximum value of the numerical range; calculate a ratio of the maximum value to the frame length L; and take the ratio as the value of N.

When N is a positive integer greater than 1, each data frame in the N data frames includes a field representing an order of the N data frames.

The processor is specifically configured to: take a service signal as a carrier signal; modulate a signal corresponding to the OAM frame in accordance with the carrier signal to obtain a modulated signal; and transmit through the transceiver the modulated signal.

The implementation of the communication device may refer to that of the information transmission method at a transmission device side with a same technical effect.

Figure 12:
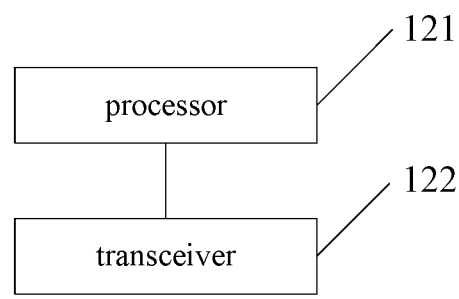
FIG. 12 is another block diagram of the communication device according to one embodiment of the present disclosure.

The present disclosure further provides in some embodiments a communication device which is a reception device and which, as shown in FIG. 12, includes a processor 121 and a transceiver 122. The processor 121 is configured to receive through the transceiver 122 an OAM frame. The OAM frame is formed through encapsulating OAM information in an optical network, and the OAM frame includes N data frames each having a frame length of L, where N varies along with a volume of the OAM information, L is a constant value regardless of the volume of the OAM information.

According to the communication device in the embodiments of the present disclosure, the OAM frame is received and it is formed through encapsulating OAM information in an optical network. The OAM frame includes N data frames each having a frame length of L, where N varies along with the volume of the OAM information, L is a constant value regardless of the volume of the OAM information, so as to transmit the OAM information in a length-variable frame. As a result, it is able to, on one hand, facilitate encoding and decoding of a message, simplifying the processing and reduce the time consumption, and on the other hand, facilitate the extension in accordance with a message content and ensure the extendibility, thereby to solve such problems as complicated processing, being time-consuming, and poor extendibility in the conventional OAM information transmission scheme.

The data frame includes a variable first field for carrying variable OAM information, a second field for indicating a value of N or a length of the OAM information, a third field for carrying a check sum, and a variable fourth field for padding a vacant part of the data frame.

To be specific, the check sum carried in the third field is used to check contents associated with the OAM information in the data frame.

In the embodiments of the present disclosure, when N is a positive integer greater than 1, each data frame of the N data frames includes a field representing an order of the N data frames. The processor is further configured to perform frame alignment on the OAM frame in accordance with the field representing the order of the N data frames in each data frame of the N data frames, so as to obtain the OAM information in each data frame.

The implementation of the communication device may refer to that of the information transmission method at a reception device side with a same technical effect.

The present disclosure further provides in some embodiments a communication device including a memory, a processor, and a program stored in the memory and executed by the processor. The processor is configured to execute the program so as to implement the above-mentioned information transmission method at a transmission device side or a reception transmission side.

The implementation of the communication device may refer to that of the information transmission method at the transmission device side or the reception device side with a same technical effect.

The present disclosure further provides in some embodiments a readable storage medium storing therein a program.

The program is executed by a processor so as to implement the steps of the above-mentioned information transmission method at a transmission device side or a reception transmission side.

The implementation of the readable storage medium may refer to that of the information transmission method at the transmission device side or the reception device side with a same technical effect.

The readable storage medium may be Ferromagnetic Random Access Memory (FRAM), Read-Only Memory (ROM), Programmable ROM (PROM), Erasable PROM (EPROM), Electrically Programmable ROM (EPROM), flash memory, magnetic surface memory, optical disc, Compact Disc-ROM (CD-ROM), etc.

It should be appreciated that, such words as "first" and "second" are merely used to differentiate similar objects rather than to represent any specific order.

In addition, in the case of no conflict, the technical solutions in the embodiments of the present disclosure may be combined in any appropriate manner.

It should be appreciated that, the functional members described in the specification may be referred to as modules or units, so as to emphasize the independence of the implementation in a more particular manner.

In the embodiments of the present disclosure, the modules or units may be implemented by software, so as to be executed by various processors. For example, an identified, executable code module or unit may include one or more physical or logical blocks including computer instructions, and the module or unit may be constructed as an object, a process or a function. Even so, the executable codes of the identified modules are unnecessary to be physically located together, but may include different instructions stored at different locations. When these instructions are logically combined together, they may form the modules or units and achieve the prescribed purposes of the modules or units.

Actually, the executable code module or unit may be a single instruction or a plurality of instructions, and may even be distributed at different code segments, in different programs, or across a plurality of memory devices. Also, operational data may be identified in the modules or units, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information transmission method, which is applied to architecture of an optical network, the architecture of the optical network comprising a transmission device and a reception device both being provided with optical communications modules, the information transmission method comprising:
   obtaining, by the transmission device, Operation, Administration and Maintenance (OAM) information from the architecture of the optical network;
   encapsulating, by the transmission device, the obtained OAM information to form an OAM frame, the OAM frame comprising N data frames each having a frame length of L, N varying along with a volume of the OAM information, L being a constant value regardless of the volume of the OAM information; and
   transmitting, by the transmission device, the OAM frame to the reception device,
   wherein each of the N data frames comprises a variable first field for carrying variable OAM information, and a variable fourth field for padding a vacant part of the data frame, wherein the variable fourth field is not checked during checking operation;
   wherein the data frame further comprises modular ID, which is used to identify a management channel corresponding to the data frame.

2. The information transmission method according to claim 1, wherein the data frame further comprises a second field for indicating a value of N or a length of the OAM information, a third field for carrying a check sum.

3. The information transmission method according to claim 2, wherein the check sum carried in the third field is used to check contents associated with the OAM information in the data frame.

4. The information transmission method according to claim 2, wherein when N is 1, prior to encapsulating the obtained OAM information, the information transmission method further comprises: determining the volume of the OAM information; and padding the OAM information into the first field; or
   wherein when N is a positive integer greater than 1, prior to encapsulating the obtained OAM information, the information transmission method further comprises: determining the volume of the OAM information; judging whether the volume of the OAM information is greater than or equal to a predetermined threshold; and determining a value of N when the volume of the OAM information is greater than or equal to the predetermined threshold.

5. The information transmission method according to claim 4, wherein the determining the value of N comprises: determining a numerical range matching the volume of the OAM information; determining a maximum value of the numerical range; calculating a ratio of the maximum value to the frame length L; and taking the ratio as the value of N.

6. The information transmission method according to claim 5, wherein the encapsulating the obtained OAM information to form the OAM frame comprises: forming a first field of each data frame in the N data frames in accordance with the obtained OAM information; forming a second field of each data frame in the N data frames in accordance with the value of N; and forming the OAM frame in accordance with the N data frames.

7. The information transmission method according to claim 1, wherein when N is a positive integer greater than 1, each data frame in the N data frames comprises a field representing an order of the N data frames.

8. The information transmission method according to claim 1, wherein the transmitting the OAM frame comprises: taking a service signal as a carrier signal; modulating a signal corresponding to the OAM frame in accordance with the carrier signal to obtain a modulated signal; and transmitting the modulated signal.

9. An information transmission method, which is applied to architecture of an optical network, the architecture of the optical network comprising a transmission device and a reception device both being provided with optical communications modules, the information transmission method comprising:
 receiving, by the reception device, an OAM frame, wherein the OAM frame is formed through encapsulating OAM information in an optical network, and the OAM frame comprises N data frames each having a frame length of L, where N varies along with a volume of the OAM information, L is a constant value regardless of the volume of the OAM information,
 wherein each of the N data frames comprises a variable first field for carrying variable OAM information, and a variable fourth field for padding a vacant part of the data frame, wherein the variable fourth field is not checked during checking operation;
 wherein the data frame further comprises modular ID, which is used to identify a management channel corresponding to the data frame.

10. The information transmission method according to claim 9,
 wherein the data frame further comprises a second field for indicating a value of N or a length of the OAM information, a third field for carrying a check sum.

11. The information transmission method according to claim 10, wherein the check sum carried in the third field is used to check contents associated with the OAM information in the data frame.

12. The information transmission method according to claim 9, wherein when N is a positive integer greater than 1, each data frame of the N data frames comprises a field representing an order of the N data frames, wherein the information transmission method further comprises performing frame alignment on the OAM frame in accordance with the field representing the order of the N data frames in each data frame of the N data frames, so as to obtain the OAM information in each data frame.

13. A transmission device, which is disposed in architecture of an optical network, the architecture of the optical network comprising the transmission device and a reception device both being provided with optical communications modules, and the transmission device comprising a processor and a transceiver, wherein the transceiver is configured to: obtain OAM information from the architecture of the optical network; encapsulate the obtained OAM information to form an OAM frame, the OAM frame comprising N data frames each having a frame length of L, N varying along with a volume of the OAM information, L being a constant value regardless of the volume of the OAM information; and transmit through the transceiver the OAM frame to the reception device,
 wherein each of the N data frames comprises a variable first field for carrying variable OAM information, and a variable fourth field for padding a vacant part of the data frame, wherein the variable fourth field is not checked during checking operation;
 wherein the data frame further comprises modular ID, which is used to identify a management channel corresponding to the data frame.

14. A reception device, and the reception device comprising a processor and a transceiver, wherein the processor is configured to call and execute a computer program, the information transmission method according to claim 10 is realized.

15. The transmission device according to claim 13, wherein the data frame further comprises a second field for indicating a value of N or a length of the OAM information, a third field for carrying a check sum.

16. The transmission device according to claim 15, wherein the check sum carried in the third field is used to check contents associated with the OAM information in the data frame.

17. The transmission device according to claim 15, wherein when N is 1, prior to encapsulating the obtained OAM information, the information transmission method further comprises: determining the volume of the OAM information; and padding the OAM information into the first field; or
 wherein when N is a positive integer greater than 1, prior to encapsulating the obtained OAM information, the information transmission method further comprises: determining the volume of the OAM information; judging whether the volume of the OAM information is greater than or equal to a predetermined threshold; and determining a value of N when the volume of the OAM information is greater than or equal to the predetermined threshold.

18. The transmission device according to claim 17, wherein the determining the value of N comprises: determining a numerical range matching the volume of the OAM information; determining a maximum value of the numerical range; calculating a ratio of the maximum value to the frame length L; and taking the ratio as the value of N.

19. The transmission device according to claim 18, wherein the encapsulating the obtained OAM information to form the OAM frame comprises: forming a first field of each data frame in the N data frames in accordance with the obtained OAM information; forming a second field of each data frame in the N data frames in accordance with the value of N; and forming the OAM frame in accordance with the N data frames.

20. The transmission device according to claim 13, wherein when N is a positive integer greater than 1, each data frame in the N data frames comprises a field representing an order of the N data frames,
 wherein the transmitting the OAM frame comprises: taking a service signal as a carrier signal; modulating a signal corresponding to the OAM frame in accordance with the carrier signal to obtain a modulated signal; and transmitting the modulated signal.

\* \* \* \* \*